United States Patent [19]

Chisholm et al.

[11] Patent Number: 4,510,499
[45] Date of Patent: Apr. 9, 1985

[54] TACAN DATA LINK SYSTEM

[75] Inventors: John P. Chisholm, Olympic Valley, Calif.; Donald G. Morgan, Reston, Va.

[73] Assignee: Vega Precision Laboratories, Inc., Vienna, Va.

[21] Appl. No.: 261,619

[22] Filed: May 7, 1981

[51] Int. Cl.³ .............................................. H04B 7/00
[52] U.S. Cl. .................................. 343/456; 343/6.5 R
[58] Field of Search ................... 455/166; 343/106 R, 343/112 TC, 100 CS, 398, 456, 451, 417, 6.5 R

[56] References Cited

U.S. PATENT DOCUMENTS

| | | | |
|---|---|---|---|
| 3,041,538 | 6/1962 | Bodez . | |
| 3,151,323 | 9/1964 | Baldridge . | |
| 3,162,857 | 12/1964 | Sanders . | |
| 3,529,243 | 9/1970 | Reindl . | |
| 3,680,117 | 7/1972 | Eckert et al. . | |
| 3,747,107 | 7/1973 | Poppe et al. | 343/417 |
| 3,803,610 | 4/1974 | Hastings et al. | 343/105 LS |
| 3,821,523 | 6/1974 | Chisholm et al. . | |
| 3,887,872 | 6/1975 | Sharpe | 343/114 |
| 3,891,985 | 6/1975 | Oigarden et al. . | |
| 4,069,455 | 1/1978 | Sherman, Jr. | 455/62 |
| 4,363,933 | 12/1982 | Mercer | 455/226 |
| 4,371,978 | 2/1983 | Lukso | 455/184 |

Primary Examiner—Theodore M. Blum
Attorney, Agent, or Firm—Banner, Birch, McKie & Beckett

[57] ABSTRACT

The instant invention permits a communication function to be performed by utilizing the transmitter/receiver portion of existing navigational equipment such as, for example, DME equipment, TACAN/DME equipment, and VOR/DME equipment. Rather than utilizing the same channel as the navigation function, the communication function utilizes another of the equipment's channels specifically assigned for communication purposes. Specifically, when it is desired to communicate with a communication or master station, the airborne or remote navigational equipment is momentarily turned from the navigational frequency channel to the frequency channel specifically assigned for the communication function. While momentarily tuned to the communication channel, it sends data to, and receives data from, the communication station. Having completed the communication process, the airborne or remote unit tunes back to the navigational channel and resumes its navigational function. Tuning from the navigational channel and the time spent on the communication channel is sufficiently short so that the navigational function is not impaired.

52 Claims, 7 Drawing Figures

TACAN DATA LINK SYSTEM

BACKGROUND OF THE INVENTION

The invention relates of generally to the field of navigational systems, and is directed particularly to a new and improved TACAN/DME data link system which incorporates full navigation and communication functions on existing TACAN/DME equipment.

An airborne vehicle must frequently communicate with a ground station for purposes of relaying messages and obtaining data. Such communication can be performed on a separate radio frequency transmitter and receiver used solely for that purpose. This requires, however, the installation of additional airborne and ground equipment which represents an undesirable factor in terms of cost and weight. This is especially the case in certain modern airborne vehicles, such as unmanned drones, where compactness is desired.

One suggestion is that such communication could be performed by utilizing the transmitter and receiver carried aboard the airborne vehicle, such as, for example, the navigational equipment, for other purposes. One such navigational system that could be employed is the airborne TACAN/DME system found in wide airborne use, both civil and military. This system employs a pulse code format and has been assigned 252 crystal controlled channels centered around 1,000 MHz.

The possibility of communicating over a TACAN/DME system, based on the pulse nature of the system, has been investigated by several groups. For example, ITT has built a TACAN/DME data link system that permitted communication with multiple aircraft (see Electrical Communication, Vol. 34, Sept. 1957). The ITT system operated on a single frequency channel such that the aircraft would communicate only with the ground station from which it received its navigational data. The communication data was interleaved with the navigational data on the assigned and fixed frequency of the navigational ground station. A system based on this concept was built and flight tested but was never implemented for operational use.

A basic disadvantage of the ITT TACAN/DME system was that it required interleaving the navigation and communication functions on the same frequency. This required a special signal format to prevent interference between the communication and navigational function. This modified signal format, in turn, required extensive, complicated and costly modifications of the communication equipment. In fact, the airborne or ground based TACAN/DME equipment used to perform the navigation function required equipment modifications to restrict its random operating characteristic. The equipment modification was necessary for all units within the system, even those that did not supply or receive communication data to ensure compatability with the new signal format. The use of a special signal format to permit sharing of the same frequency channel also precluded a fully random operation of the navigational system. As a result, the number of aircrafts that could operate within the system was severely limited.

Recently, proposals have been advanced to add a more limited communication function to the TACAN/DME system. One such system is termed DDBS (i.e., Digital Data Broadcast System). Ground station transmissions in this system are coded to radiate a limited amount of data, such as station identity and station location. No further air-to-ground transmissions are provided. In fact, the data link is quite limited and, in many respects, is merely an extension of the limited data transmission capability that occurs with existing TACAN/DME ground stations, such as providing a station identifying code.

Another system for a limited air-to-ground TACAN/DME data link system has also been proposed (see IEEE 1980 PLANS Record, VDME-Based Azimuth System, p. 216-Horst Vogel et al). This system is also described in U.S. Pat. No. 3,680,117. In response to an interrogation pulse, the system's ground station irradiates a series of communications pulses in addition to the normal ranging pulses. These communications pulses immediately follow the ranging pulses and contain communication information. The communication pulses are identified by the airborne unit which sent the interrogation pulses since they are in a timed relationship with the airborne units. In general, these communication pulses convey information regarding the arrival angle of the radiated signal of the airborne interrogator and, as such, provide a form of navigational data. This system, however, doesn't have the capability of permitting the ground station to identify the airborne interrogator. Moreover, it merely provides uplink information; downlink communication is not offered. This system, like other prior art systems, provides a very limited data link capability.

In summary, with the prior art systems it was not possible for existing and unmodified TACAN/DME equipment to receive navigational data on a frequency channel used for both navigation and communication without interferring with the navigation function. Adding of the communication function, not only required extensive and complicated modifications in the communication equipment to comply with a new signal format, but also affected the operational characteristics of the existing equipment. The added communication function generated a substantial decrease in the navigational capability of the system, particularly in the number of aircraft that could obtain TACAN/DME range information. These systems did not solve the practical problems of fully incorporating a dual navigation and communication capability without adversely affected the existing navigational functions. By utilizing some of the TACAN/DME navigational pulses for communication, the prior art systems affected a decrease in the number of pulses available for navigation and, therefore, created a substantial decrease in the navigational capacity of the system.

SUMMARY OF THE INVENTION

It is an overall object of the present invention to provide a new and improved TACAN/DME data link system which overcomes the disadvantages of the prior art systems.

A specific object of this invention is to provide a new and improved TACAN/DME data link system which incorporates full navigation and communication functions on existing TACAN/DME equipment.

Another specific object is to provide a new and improved TACAN/DME data link system which incorporates full navigation and communication functions on separate frequency channels.

A further specific object is to provide a new and improved TACAN/DME data link system incorporating full navigation and communication functions without requiring a special signal format to prevent interference between the two functions.

A still further specific object of the present invention is to provide a new and improved TACAN/DME data link system incorporating full navigation and communication functions without requiring extensive and complicated modifications to existing equipment.

Another specific object is to provide a new and improved TACAN/DME data link system incorporating full navigation and communication capability without adversely affecting the navigation function of existing TACAN/DME equipment.

Still another specific object of the present invention is to provide a new and improved navigation and communication system wherein the navigation and communication functions are performed by momentarily switching the navigation receiving unit from its navigational channel to a separate communication channel without impairing the navigation function.

A still further object of the present invention is to provide a new and improved navigation and communication system wherein the navigation receiving unit can be momentarily switched from its navigational channel in either a synchronous or a random manner.

Another further object of the present invention is to provide a navigation and communication system wherein the navigation and communication functions are performed on separate channels of existing navigational equipment.

The instant invention permits a communication function to be performed by utilizing the transmitter/receiver portion of existing navigational equipment such as, for example, DME equipment, TACAN/DME equipment, and VOR/DME equipment. Rather than utilizing the same channel as the navigation function, the communication function utilizes another of the equipment's channels specifically assigned for communication purposes. In particular, when it is desired to communicate with a communication or master station, the airborne or remote navigational equipment is momentarily tuned from the navigational frequency channel to the frequency channel specifically assigned for the communication function. While momentarily tuned to the communication channel, it sends data to, and receives data from, the communication station. Having completed the communication process, the airborne or remote unit tunes back to the navigational channel and resumes its navigational function. Tuning from the navigational channel and the time spent on the communication channel is sufficiently short so that the navigational function is not impaired. Communication between a particular airborne vehicle and the ground station is arranged so that it doesn't interfere with the other communication that occurs between that ground station and the other airborne vehicles.

The instant invention permits uplink and downlink data communication in addition to full navigation by employing the existing navigational equipment. By utilizing an encoder/decoder according to this invention coupled to the existing navigational equipment, separate frequency channels are assigned for the navigational function and the communication function. As a result, the following advantages are obtained:

(1) There is no adverse impact on the operation of the existing navigation function.

(2) It is not necessary to modify the existing airborne navigational equipment in order for it to continue to perform its navigation function.

(3) It is not necessary to modify the existing ground based navigational equipment in order for it to continue to provide navigational data.

(4) Complete navigation and communication capability is permitted by merely incorporating an encoder/decoder according to the invention on each airborne and ground based navigational equipment where communication is desired.

(5) A single ground based navigational-type transmitter and receiver can be utilized for communicating with many aircrafts; this can be done even in an environment wherein each aircraft utilizes different navigational ground stations. This aspect is particularly important in a congested area containing many different airports and aircrafts flying within the area. For example, some of these aircrafts will be receiving navigational data from one TACAN/DME station, while others will be receiving navigational data from another TACAN/DME station serving another airport. Accordingly, the use of separate communication station at each navigational ground station would be costly and unmanagable.

(6) By completely separating the communication and navigation functions, it is possible to utilize a number of various types of communication formats, and thereby permit extensive two-way communication between a multiplicity of navigational units. Since there is no need to consider the existing navigational format, the existing navigational capability remains unaffected and the communication format and its associated capability is not restricted.

DESCRIPTION OF THE PREFERRED EMBODIMENT

Figure 1:
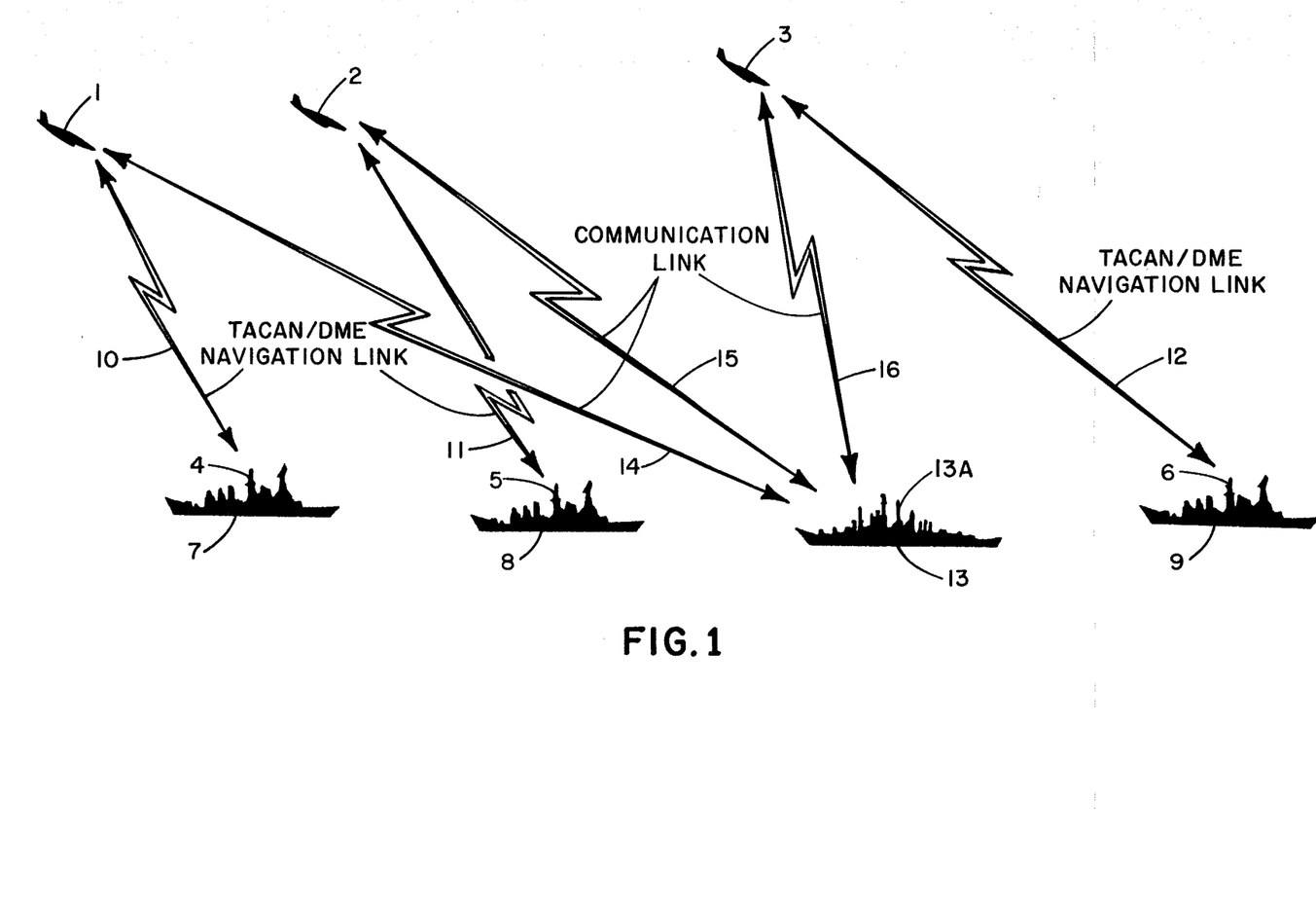
FIG. 1 shows a TACAN data link system according to the invention wherein each airborne vehicle obtains its guidance data from a respective TACAN/DME navigational station while communicating with a single communication station via a TACAN/DME radio frequency link.

Referring to the drawings, FIG. 1 illustrates a preferred embodiment of the invention for providing an override command of multiple target drones. In this embodiment, it is desired to establish communication of up to ten drones that are using TACAN/DME guidance data from a ship equipped with a standard TACAN/DME navigation station. The guidance data is processed by the drone to home in on the ship for simulating a missile attack. With this system, it is desired to establish communication with the drones from one master communication station to recover the drones that haven't been destroyed. That is, if the drones are not destroyed by the ships, they will be directed from their attack, at a certain range, and recovered for future training missions. In the prior art systems, such communication is accomplished by utilizing additional equipment which creates a special RF link, as previously disclosed. This invention, however, eliminates the need for such equipment with a concomitant substantial reduction in cost and weight of the airborne system. In the instant invention, communication signals are supplied to the drone to periodically override the existing navigation signals transmitted between various target ships and their respective airborne drones, each utilizing existing uplink and downlink navigational equipment. The existing equipment used in each drone (e.g., TACAN/DME) is augmented by a separate encoder/decoder which permits performance of the additional command functions requested by the communication station.

FIG. 1 shows three remote stations (i.e., airborne vehicles) 1, 2 and 3 which obtain TACAN/DME navigational data from navigational stations 4, 5 and 6, respectively. TACAN/DME navigational stations are respectively positioned on ships 7, 8 and 9. Each navigational station is operating on a separately assigned frequency channel for transmitting and receiving navigational information over radio frequency navigational links 10, 11 and 12. The airborne vehicles and the navigational stations could, for example, utilize a TACAN/DME, a VOR/DME or a DME navigation system for navigating the vehicle towards a specific ship.

A fourth ship 13 carries a communication station 13A for transmitting and receiving communication information. The transmitter/receiver portion of a navigation station, for example, a TACAN/DME station, could be used for this purpose. This station, however, would not need the TACAN rotating antenna used for generating TACAN angular navigational information or the normal TACAN/DME beacon function. This transmitter and receiver unit, including its conventional omnidirectional antenna, merely serves to establish RF communication links 14, 15 and 16 with each respective airborne vehicle on a single assigned communication channel. As used in this application, the term communication information refers to information other than the navigational information which is usually supplied over existing TACAN/DME, DME, or VOR/DME radio frequency links.

Each airborne vehicle has its TACAN/DME navigational unit tuned to a respective TACAN/DME navigation station from which it obtains its navigational information. As the vehicles are being guided to their respective ship, each airborne TACAN/DME is momentarily tuned, at separate times, to the assigned communication channel to establish a communication telemetry link with the communication station. While tuned to the communication channel, each airborne navigational unit transmits communication data to, and receives communication data from, communication station 13A.

This communication function can be performed in either a random or a synchronous manner. During random operation, each airborne navigational unit randomly and momentarily tunes from its navigational channel to the communication channel for transmitting communication data to, and receiving communication data from, the communication station. It then tunes back to the navigational channel to resume its reception and transmission of navigational information. This is similar to the random guidance ranging function performed by existing TACAN/DME units whereby the airborne unit randomly interrogates, and range tracks, replies from the navigational station. Random ranging or communication has the advantage of simplicity of the airborne equipment. It has the disadvantage, however, of being susceptible to interference since other units are simultaneously trying to range to, or communicate with, the navigation station. Such interference problems can readily be overcome by standard techniques, known in the art, provided the number of airborne units utilizing the same navigational ground station is not excessive.

In the synchronous communication system, each vehicle is assigned a discrete time slot, or time interval, and performs its respective communication function periodically during that interval of time. While the synchronous technique has the advantage of minimizing interference, it has the disadvantage of requiring greater complexity of the airborne equipment.

Figure 2:
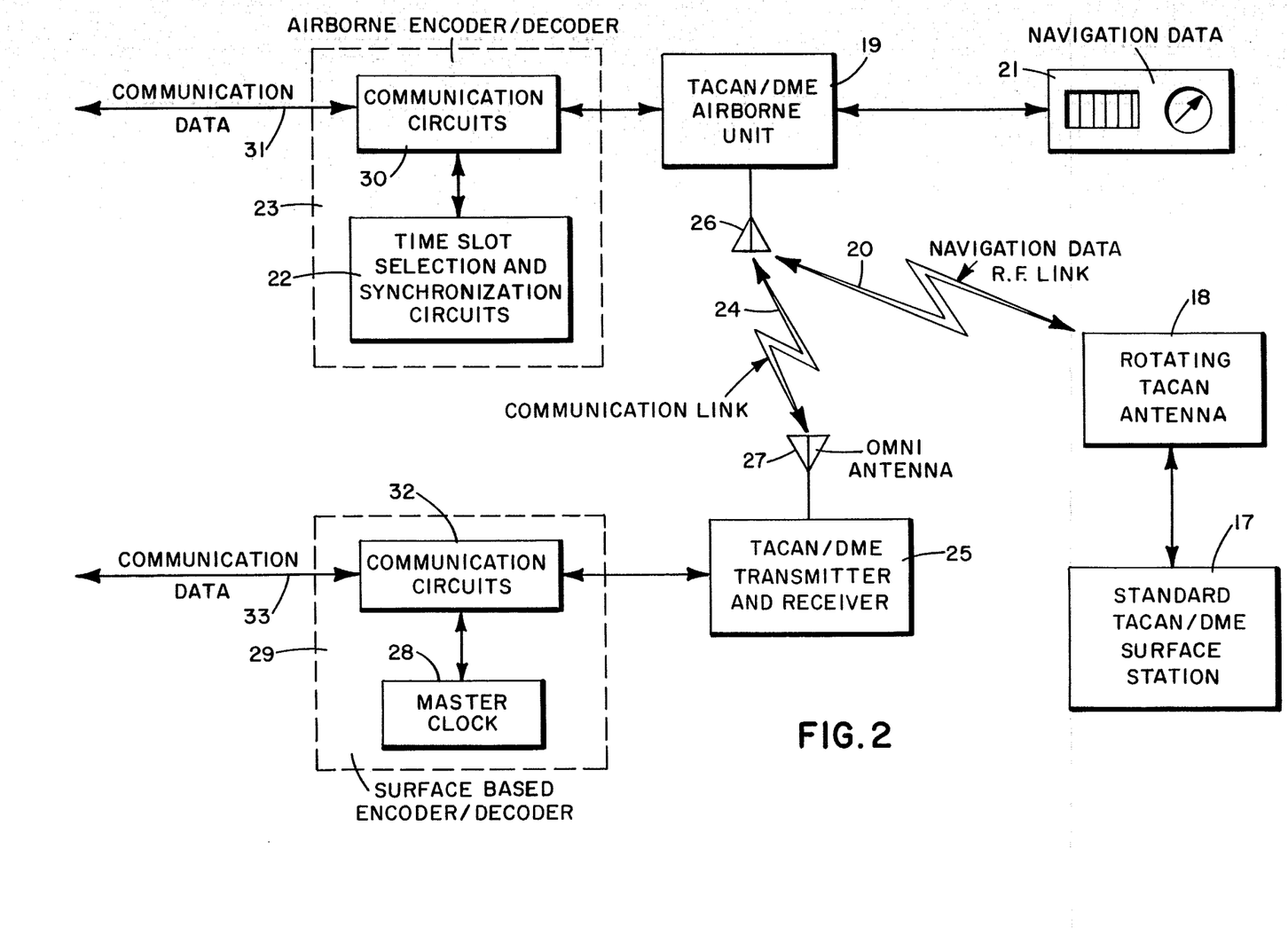
FIG. 2 is a block diagram of a navigational data link system according to the invention.

FIG. 2 is a block diagram of the system shown in FIG. 1 utilizing synchronous operation comprising: a conventional TACAN/DME navigation station 17, having a rotating TACAN antenna 18; a communication station having TACAN/DME navigational unit 25 and omnidirectional antenna 27 and an encoder/decoder 29; a remote station having an airborne TACAN/DME navigational unit 19 having antenna 26 and encoder/decoder 23. It is not necessary for communication station 25 to be a complete TACAN/DME ground station for providing range and bearing data; rather, the DME portion of a TACAN/DME ground station which provides only DME pulses can be utilized for purposes of this invention.

Briefly, the system operates as follows. Airborne unit 19 is normally tuned to navigational station 17 for receiving navigational information via RF navigational link 20 and using this information to drive an airborne guidance system, or a guidance data display 21 aboard a manned craft. Periodically, the airborne navigational unit would be tuned from the navigational channel to the communication channel by an airborne encoder/decoder 23, coupled to navigational unit 19, comprising a time slot section and synchronization circuits 22. Airborne encoder/decoder 23 also establishes synchronization with a master clock 28 within the surface based encoder/decoder 29, coupled to navigational unit 25. Once the RF communication link is established, communication circuits 30, within encoder/decoder 23, transmit communication data 31 to, and receive communication data 33 from, communication circuits 32 within communication station encoder/decoder 29.

Figure 3:
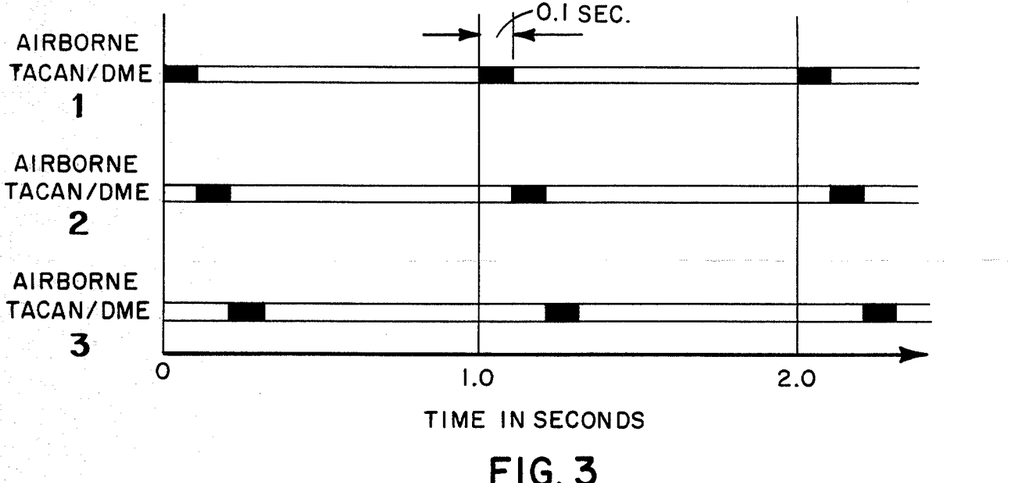
FIG. 3 is a timing diagram of one embodiment of the invention showing the synchronous momentary tuning of multiple navigational units to a communication channel.

Synchronization permits each airborne unit to communicate with the communication station only during a discrete time interval, or time slot, assigned to it. This way, each vehicle is tuned to the communication station not only at separate times, but also at the precise time the communication station is supplying it with information solely for its use. FIG. 3 shows an arrangement whereby ten airborne vehicles have assigned synchronized time slots for communicating with the communication station. Each airborne TACAN/DME unit is tuned to the communication channel for a 0.1 second interval during each one second period. In particular, encoder/decoder 23 causes a particular airborne TACAN/DME to be tuned to the communication channel for a 0.1 second time slot during a one second interval; during the balance of this interval (i.e., 0.9 seconds) the particular airborne TACAN/DME returns to its assigned navigational channel. Since the existing TACAN systems have a built in ten-second memory to accomodate signal fading, this 0.1 second channel hopping characteristic does not otherwise effect navigation. Other time slot configurations can be designed in accordance with the teachings of the invention for handling more than 10 vehicles.

Figure 4:
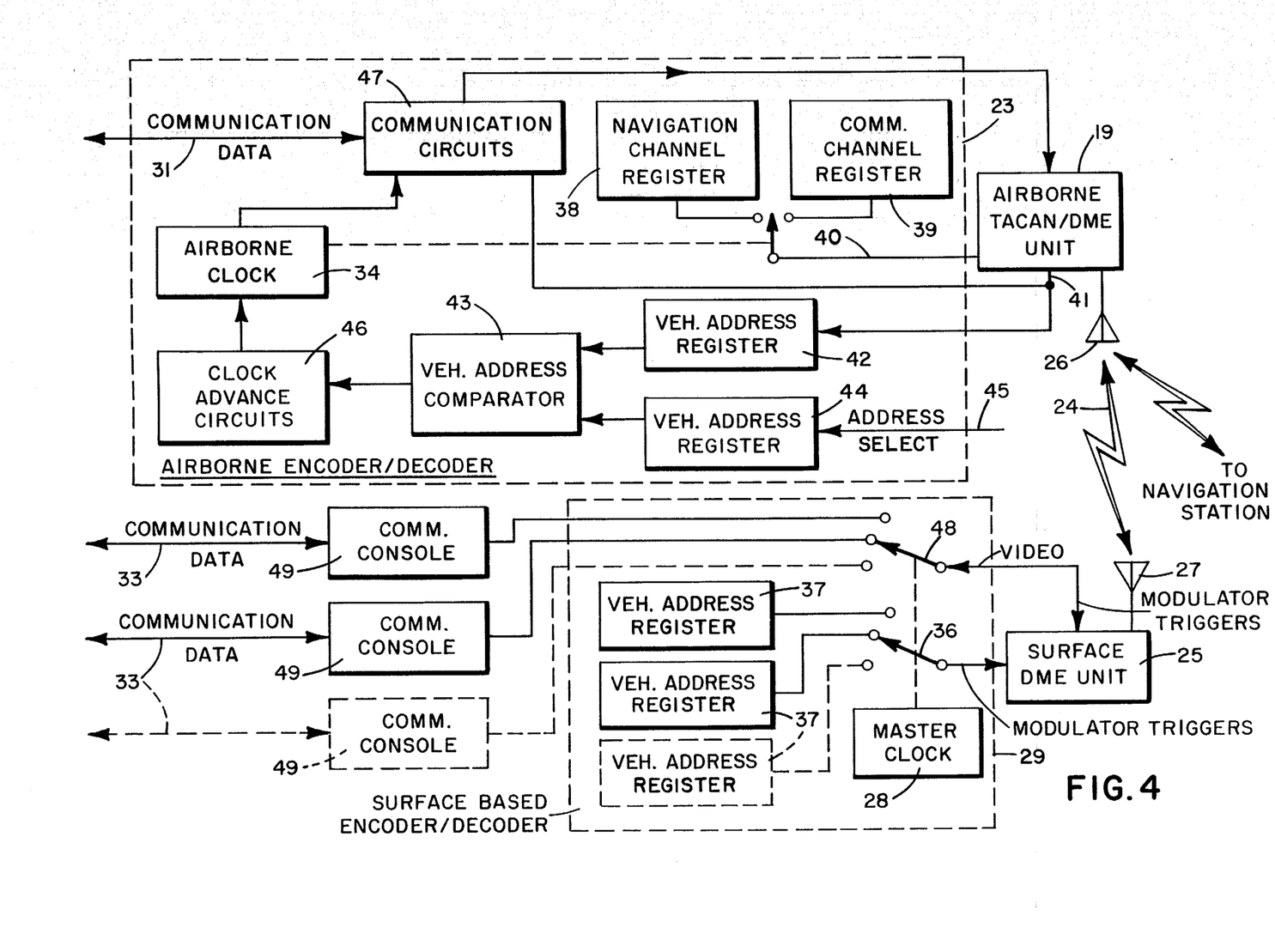
FIG. 4 is a detailed diagram of the system shown in FIG. 2.

The system necessary for performing this synchronization for tuning of the existing navigational equipment is shown in FIG. 4. In particular, airborne clock 34 is synchronized with respect to master clock 28 within encoder/decoder 29 of the communication system. Master clock 28 sequentially selects, by means of switch 36, each of ten address vehicle registers 37. Each register 37 contains an address code assigned to a respective vehicle; consequently, the address codes radiated by DME unit 25 are sequentially changed so that communication with each vehicle can occur over RF communication link 24 at a discrete 0.1 second interval during the one second period. Clock 28 cycles through the ten vehicle registers 37 within a one second interval.

Each airborne unit contains two channel tuning registers 38, 39 within encoder/decoder 23. Register 38 contains tuning code for the navigational channel of the TACAN/DME unit 19, while register 39 contains the tuning code for its communication channel. Airborne clock 34 controls the selection of the register which will be supplied to unit 19 via channel change bus 40. During a one second interval, unit 19 transmits and receives navigational information on the navigational channel for 0.9 seconds, and transmits and receives communication information on the communication channel for 0.1 seconds.

While tuned to the communication channel, navigational unit 19 supplies a signal to a receiver output line 41 containing the particular address code transmitted by DME unit 25 during that interval. This code will designate a particular remote station and be stored in vehicle address register 42. This address code is compared in address comparator 43 with a preselected address code stored in vehicle address register 44. The preselected code is selected prior to flight by address select line 45 and identifies the particular time slot interval assigned to the unit for communication.

Upon receiving the communication signal radiated by DME unit 25, address comparator 43 determines the unsynchronized airborne clock error with respect to master clock 28. This is done by comparing the designated address code received having a certain time slot identity with the stored preselected address code. For example, if the designated address code is 1 and the preselected address code is 3, the unsynchronized airborne clock must be advanced by two time slots or 0.2 seconds. Clock 34 is advanced by clock advance circuit 46. Prior to its synchronization, a particular airborne DME unit 19 is prohibited from transmitting while tuned to the communication channel. This is done to prevent interference with other airborne vehicles that have been synchronized and are communicating during their assigned time slot with the communication station.

Upon synchronizing the remote station, the communication circuits 47 are activated by airborne clock 34 to send and receive communication information 31 via DME unit 19 to the surface based DME unit 25. Correspondingly, DME unit 25 will receive and transmit this information. The communication information will be routed under control of master clock 28 and switch 48 to communication consoles 49. These consoles are used to interface with operators, assigned to control the airborne vehicles and to process the communication data 33.

Having synchronized airborne clock 34 with master clock 28 it is possible to send and receive communication data. The communication data can be sent by a variety of methods, digital or analogue, well known in the prior art. The communication technique described below is a format similar to that which has been extensively used for drone control and equipment made by Vega Precision Laboratories, Vienna, Va., and described in their engineering standard obtainable from Vega Precision Labs.

Figure 5:
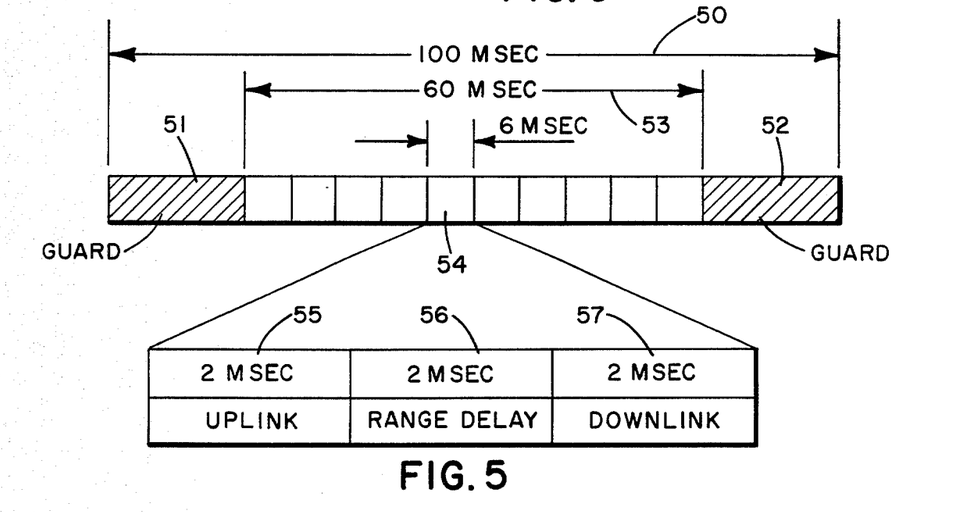
FIG. 5 is a detailed drawing of the communication interval shown in FIG. 3.

The 0.1 second message timing structure (i.e., message slot 50) for an individual vehicle is shown in FIG. 5. Message slot 50 has guard bands 51, 52 which are 20 milliseconds long at each end of the slot. These bands are used to permit tuning the TACAN/DME equipment between the navigational channel and the communication channel. They provide adequate time for the channel tuning function of modern airborne TACAN/DME units, such as the DPN-13 manufactured by King Radio Corporation, Olathe, Kans.

The remaining time slot 53 having a length of 60 milliseconds is used for the transmission of multiple uplink and downlink messages. Generally, it is desired to transmit ten uplink and ten downlink messages. This is accomplished by further dividing the 60 millisecond communication interval 53 into ten 6 millisecond message intervals 54. Each 6 millisecond message interval 54 is further divided into three 2 millisecond long intervals 55, 56 and 57. The first two millisecond interval 55 is used for an uplink message, that is, a message from TACAN/DME unit 25 to TACAN/DME unit 19. The second 2 millisecond slot 56 is allocated for the propogation time delay between unit 25 and unit 19 caused by the physical separation between the equipment. The third 2 millisecond slot 57 is used for the downlink message.

Figure 6:
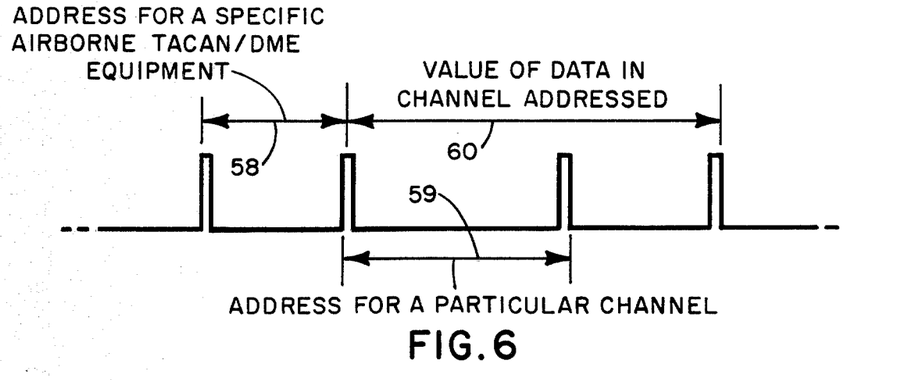
FIG. 6 shows an example of a pulse position coding format that can be utilized with the invention.

In the preferred embodiment of the invention, the communication information is carried by four pulses wherein the data is contained within the relative spacing of the pulses. This pulse position coding technique is shown in FIG. 6. Other types of coding techniques can be employed, such as pulse code modulation. The relative spacing 58 between the first two pulses contains the address of a particular vehicle. For example, a pulse spacing of 13 microseconds might identify the message as that intended for vehicle number 3 having a time slot No. 3. A pulse spacing of 16 microseconds might identify the message as being intended for vehicle No. 6 having a time slot No. 6.

This address code, as received by airborne TACAN/DME unit 19, would be supplied to address register 42 and compared with data stored in register 44 to determine if the message being received was intended for that vehicle. This is a redundant feature if the vehicle has previously been time slot synchronized, as discussed previously. That is, upon being synchronized, TACAN/DME unit 19 tunes to the communication channel only during its assigned slot interval. Therefore, in the absence of clock drift, any message received during that interval is intended only for that vehicle. This redundant feature is intended to continuously monitor and correct the time slot synchronization.

Upon verifying the vehicle address, a particular function within the vehicle can be controlled, changed or monitored (e.g., vehicle altitude, air speed, etc.). This is performed by next sending the address corresponding to the particular function that will be controlled. This function address is contained in the spacing 59 between the second and third pulses in a manner similar to vehicle address. For example, a spacing of 30 microseconds between the second and third pulse might correspond to the address for an altitude, while a spacing of 31 microseconds might correspond to the address for an air speed command. Having selected the function to be controlled, the desired control information is supplied. This control information is contained in the spacing 60 between the second and fourth pulses.

Figure 7:
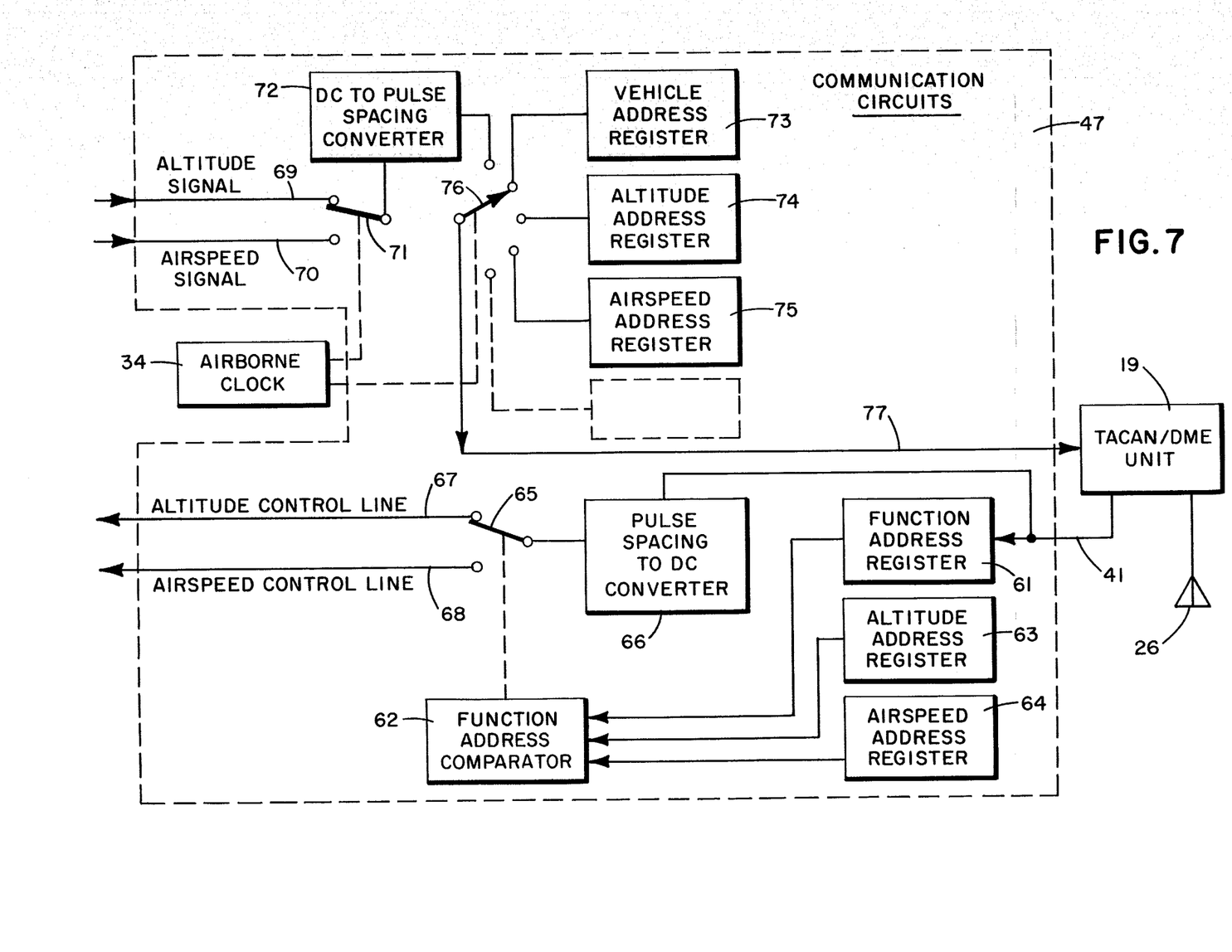
FIG. 7 is a detailed diagram of the communication circuits shown in FIG. 4.

This process of selecting a function or utilizing a function address is accomplished in a manner similar to that described above for vehicle address. As shown in FIG. 7, the receiver output line 41 of TACAN/DME unit 19 is supplied to function address register 61 for identifying the function to be controlled. The function address register 61 is supplied to a function address comparator 62. Also supplied to this comparator are function address registers which store addresses corresponding to the controllable functions (e.g., altitude function address 63, air speed function address 64, etc.). Function comparator 62 identifies the function to be corrected by comparing the code in register 61 with the codes of each of the possible controllable functions. The output of comparator 62 selects, via switch 65, the proper control line (e.g., altitude control line 67, air speed control line 68, etc.) of the function to be controlled.

Switch 65 connects converter 66 with the proper control line. Converter 66 is used to convert the spacing between the second and fourth pulses into a signal useful for control purposes. For example, if the useful control signal was a DC voltage, the pulse spacing to DC converter 66 would convert the spacing between the third and fourth pulses to a DC voltage that would be supplied to an appropriate control line. Converting the spacing between pulses to a DC voltage is a standard process, known in the art. For example, the occurance of the second pulse could start the linear charging of a capacitor and the fourth pulse could stop the charging process so that the voltage stored on the compacitor would be directly related to the spacing between the third and fourth pulses.

In a similar manner, the data to be communicated from the airborne TACAN/DME unit 19 to the communication station are supplied to communication circuits 47 in a DC form on an altitude signal line 69 or air speed signal line 70, etc. These lines are sequentially switched by switch 71 under control of airborne clock 34 to supply the respective signals to a DC to pulse spacing converter 72. The information contained in vehicle address register 73 and function address register 74, 75, etc. are combined in a proper time sequence with the data contained in DC to pulse spacing converting 72 to generate the four pulse code. The spacing between the first and second pulses would convey the address of the vehicle that is transmitting the information. The spacing between the second and third pulses conveys the function that has been selected under control of airborne clock 34. The spacing between the second and fourth pulses conveys the value of the function that was selected.

This process of generating the pulse code is accomplished by switch 76 under the control of clock 34. Switch 76 first connects the output of vehicle address register 73 to transmitter trigger line 77. It then connects the output of the function register, corresponding to the functions supplied to converter 72 to transmitter trigger line 77. Finally, it connects the output of the DC to pulse position converter 72, to trigger line 77.

In this manner, communication is established between the airborne and ground units by utilizing the existing navigational unit and without impairing its navigational function.

This communication function can be readily added to existing airborne TACAN/DME units by means of an external encoder/decoder unit connected to the navigational unit via: existing channel change bus 40; existing receiving output line 41; and, added transmitter trigger line 77. Adding this line requires minimal modification. In addition, this communication capability can be readily incorporated internally in future TACAN/DME units.

While separate ground based navigational-type transmitters and receivers can be utilized for communicating with various aircrafts, a single ground based unit may be preferrable. A TACAN/DME station must provide navigational data accurate enough for the final approach of the aircraft; therefore, it is often located close to the airport. Consequently, if communication was to be provided from each navigational ground station, rather than a single centrally located ground based unit, then all such stations would have to be modified to permit full communication capability. By utilizing a single ground station to perform the communication function, however, the only major consideration is the height of its antenna; it should be located on a high structure to provide the required coverage to all airborne vehicles. Site selection for the ground based communication station is not critical in terms of navigational accuracy since it is not necessary for the communication channel to include navigational data. The invention, as a result, provides an advantage in terms of both overall airborne and ground station flexibility.

Various modifications of the invenntion may be effected by persons skilled in the art without departing from the scope and principles of the invention as defined in the appended claims. While the preferred embodiment described upon employs a synchronous communication system, the invention is not restricted to that type of system. The invention involves communication wherein a remote station (e.g., airborne, surface or ground based) employs navigational equipment which frequency hops between a channel, or channels, assigned for communication and a channel, or channels, assigned for navigation. In addition, the airborne transmitter/receiver that implements the communication RF link is not restricted to the transmitter/receiver of a TACAN/DME unit; alternatively, the transmitter/receiver of a DME portion of an airborne VOR/DME range and bearing navigation system, or the transmitter/receiver of a DME only navigation system can be employed. The airborne DME portion of such navigational systems are essentially identical, and operate with the same ground DME navigational equipment.

While the communication station is shown to be positioned at a location distant with respect to the navigational station, it could also be positioned immediately adjacent the navigation station. Further, while the preferred embodiment disclose the guidance of the remote station towards the navigation station, the invention could also be employed in the system wherein the navigational station is merely determining the position of the remote station. Moreover, it is not necessary to utilize airborne vehicles as the remote station, surface vehicles such as ships, land vehicles, etc. can also be employed. Finally, while the preferred embodiment is directed to communication information involving airspeed and altimeter signals, etc., the instant invention contemplates other forms of communication information, such as, for example, voice communication between the communication station and the remote station.

We claim:

1. In a navigation system having a plurality of remote stations each having a navigational unit for transmitting to and receiving replies from a corresponding master navigational station to obtain navigational information on a corresponding navigational channel, a communication system having a master communication station for transmitting communication information to and receiving communication information from said remote stations on a common communication channel different than each of said corresponding navigational channels, said communication system comprising:

tuning means at each of said remote stations for momentarily tuning its navigation unit from its corresponding navigational channel to said common communication channel during a synchronized assigned discrete time interval and then back to its navigational channel whereby only a single remote station communicates during its assigned time interval.

2. The navigation system of claim 1 wherein said tuning means tunes to said communication channel at periodic intervals of time.

3. The navigation system of claim 1 wherein said navigational system remains tuned to said communication channel for a period of time which is sufficiently short with respect to the time the navigational system is tuned to said navigational channel in order to prevent impairing the transmission or reception of said navigational information.

4. The navigation system of claim 1 further comprising a DME unit for transmitting or receiving said navigational and said communication information.

5. The navigation system of claim 1 further comprising a TACAN unit for transmitting or receiving said navigational and said communication information.

6. The navigation system of claim 1 further comprising: a communication circuit means, coupled to said tuning means, for decoding and encoding said communication information.

7. The navigation system of claim 6 wherein said communication circuit means comprises means for transmitting said communication information by pulse position coding.

8. The navigation system of claim 6 wherein said communication circuit means comprises means for transmitting said communication information by pulse code modulation.

9. The navigation system of claim 1 wherein said navigational information is used to guide a vehicle to a predetermined destination and said communication information overrides said navigational information to interrupt the guidance information used to guide said vehicle to said destination.

10. The navigational system of claim 2 wherein said tuning means comprises:

a navigational register means for storing a tuning code corresponding to the navigational channel;

a communication register means for storing a tuning code corresponding to the communication channel; and a clock means for controlling the selection of either said navigational register means or said communication register means.

11. The navigation system of claim 10 wherein said tuning means further comprises:

a first register means for storing a designating station code received as part of said communication information; and a second register means for storing a preselected station code.

12. The navigation system of claim 11 wherein said tuning means further comprises:

a comparator means for comparing said designating station code with said preselected station code and producing an error signal dependent upon the difference between said designating code and said preselected code;

a clock advance means, coupled to said clock means and said comparator means, for advancing said clock means in accordance with said error signal.

13. In a navigation system having a plurality of remote navigational stations each having a respective navigational channel, an encoder or decoder at each of said stations for momentarily tuning the navigation station from its respective navigational channel to a common communication channel, different than each respective navigational channel, for transmitting and receiving communication information via said navigation station during a synchronized assigned discrete time interval and then tuning back to said navigational channel whereby only a single remote navigational station communicates during its assigned time interval.

14. The navigation system of claim 13 wherein said encoder or decoder comprises a tuning means for tuning said navigation system to said communication channel at periodic intervals of time.

15. The navigation system of claim 13 wherein said navigation system remains tuned to said communication channel for a period of time which is sufficiently short with respect to the time the navigation system is tuned to said navigational channel in order to prevent impairing the transmission or reception of said navigational information.

16. The navigation system of claim 13 further comprising a DME unit for transmitting or receiving said navigational and said communication information.

17. The navigation system of claim 13 further comprising a TACAN unit for transmitting or receiving said navigational and said communication information.

18. The navigation system of claim 13 wherein said encoder/decoder comprises:

a communication circuit means for decoding and encoding said communication information.

19. The navigation system of claim 18 wherein said communication circuit means comprises means for transmitting said communication information by pulse position coding.

20. The navigation system of claim 18 wherein said communication circuit means comprises means for transmitting said communication information by pulse code modulation.

21. The navigation system of claim 13 wherein said navigational information is used to guide a vehicle to a predetermined destination and said communication information overrides said navigational information to interrupt the guidance information used to guide said vehicle to said destination.

22. The navigation system of claim 14 wherein said tuning means comprises:
- a navigational register means for storing a tuning code corresponding to the navigational channel;
- a communication register means for storing a tuning code corresponding to the communication channel; and
- a clock means for controlling the selection of either said navigational register means or said communication register means.

23. The navigation system of claim 22 wherein said tuning means further comprises:
- a first register means for storing a designating station code received as part of said communication information; and
- a second register means for storing a preselected station code.

24. The navigational system of claim 23 wherein said tuning means further comprises:
- a comparator means for comparing said designating station code with said preselected station code and producing an error signal dependent upon the difference between said designating code and said preselected code;
- a clock advance means, coupled to said clock means and said comparator means, for advancing said clock means in accordance with said error signal.

25. An encoder or decoder for use in a navigation system having a plurality of remote stations each having a navigational unit with a corresponding navigational channel for transmitting or receiving navigational information, said encoder or decoder comprising:
- tuning means for momentarily tuning the navigational unit from its navigational channel to a communication channel different than said navigational channel, and common to a plurality of said remote stations, during a synchronized assigned discrete time interval for transmitting and receiving communication information via said navigational unit and then turning back to the navigational channel whereby only a single remote station communicates during its assigned time interval.

26. The encoder or decoder of claim 25 wherein said tuning means tunes to said communication channel at periodic intervals of time.

27. The encoder or decoder of claim 25 comprising means for tuning said navigation system to said communication channel for a period of time which is sufficiently short with respect to the time the navigation system is tuned to said navigational channel in order to prevent impairing the transmission or reception of said navigational information.

28. The encoder or decoder of claim 25 wherein said navigation system comprises a DME unit for transmitting or receiving said navigational and said communication information.

29. The encoder or decoder of claim 25 wherein said navigation system comprises a TACAN unit for transmitting or receiving said navigational and said communication information.

30. The encoder or decoder of claim 25 further comprising:
- a communication circuit means, coupled to said tuning means, for decoding and encoding said communication information.

31. The encoder or decoder of claim 30 wherein said communication circuit means comprises means for transmitting said communication information by pulse position coding.

32. The encoder or decoder of claim 30 wherein said communication circuit means comprises means for transmitting said communication information by pulse code modulation.

33. The encoder or decoder of claim 25 wherein said navigational information is used to guide a vehicle to a predetermined destination and said communication information overrides said navigational information to interrupt the guidance information used to guide said vehicle to said destination.

34. The encoder or decoder of claim 26 wherein said tuning means comprises:
- a navigational register means for storing a tuning code corresponding to the navigational channel;
- a communication register means for storing a tuning code corresponding to the communication channel; and
- a clock means for controlling the selection of either said navigational register means or said communication register means.

35. The encoder or decoder of claim 34 wherein said tuning means further comprises:
- a first register means for storing a designating station code received as part of said communication information; and
- a second register means for storing a preselected station code.

36. The encoder or decoder of claim 35 wherein said tuning means further comprises:
- a comparator means for comparing said designating station code with said preselected station code and producing an error signal dependent upon the difference between said designating code and said preselected code; and
- a clock advance means, coupled to said clock means and said comparator means, for advancing said clock means in accordance with said error signal.

37. A navigation and communication system including a plurality of remote stations each having a navigational unit with a respective navigational channel and a common communication channel, different than the navigational channel, and a master navigation station for transmitting and receiving navigational information on said navigational channel for guiding, or determining the position of, the remote stations, wherein each remote station comprises:
- navigation means within each navigation unit, responsive to the transmitted navigational information from said navigation station, for establishing a navigational link on said navigational channel between the master navigation station and said remote station; and
- communication means coupled to said navigation means for transmitting and receiving, on said common communication channel, communication information between a master communication station and said remote station, said communication means comprising tuning means for momentarily tuning the navigation means from said navigational channel to said common communication channel during a synchronized assigned discrete time interval and then back to the navigational channel whereby only a single remote station communicates during its assigned time interval.

38. The navigation and communication system of claim 37 wherein said tuning means tunes to said communication channel at periodic intervals of time.

39. The navigation and communication system of claim 37 wherein said navigation means remained tuned to said communication channel for a period of time which is sufficiently short with respect to the time the time the navigation means is tuned to said navigational channel in order to prevent impairing the transmission or reception of said navigational information.

40. The navigation and communication system of claim 37 wherein said navigation means comprises a DME unit for transmitting or receiving said navigational and said communication information.

41. The navigation and communication system of claim 37 wherein said navigation means comprises a TACAN unit for transmitting or receiving said navigational and said communication information.

42. The navigation and communication system of claim 37 further comprising:
  a communication circuit means, coupled to said tuning means, for decoding and encoding said communication information.

43. The navigation and communication system of claim 42 wherein said communication circuit means comprises means for transmitting said communication information by pulse position coding.

44. The navigational system of claim 42 wherein said communication circuit means comprises means for transmitting said communication information by pulse code modulation.

45. The navigation and communication system of claim 37 wherein said navigational link is used to guide a vehicle containing said remote station to said navigation station and said communication information overrides said navigational information to interrupt the guidance information used to guide said remote station to said navigation station.

46. The navigation and communication system of claim 38 wherein said tuning means comprises:
  a navigational register means for storing a tuning code corresponding to the navigational channel;
  a communication register means for storing a tuning code corresponding to the communication channel; and
  a clock means for controlling the selection of either said navigational register means or said communication register means.

47. The navigation and communication system of claim 46 wherein said tuning means further comprises:
  a first register means for storing a designating station code received from said communication information; and
  a second register means for storing a preselected station code.

48. The navigation and communication system of claim 47 wherein said tuning means further comprises:
  a comparator means for comparing said designating station code with said preselected station code and producing an error signal dependent upon the difference between said designating code and said preselected code; and
  a clock advance means, coupled to said clock means and said comparator means, for advancing said clock means in accordance with said error signal.

49. In a navigation system having a plurality of remote stations and each having a navigation unit for transmitting or receiving navigational information on a particular one of said navigation channels, a method of transmitting and receiving communication information on a common communication channel corresponding to another of said channels, different than said one navigational channel, comprising the step of momentarily tuning said navigation unit from said navigational channel to said common communication channel during a synchronized assigned discrete time interval and then back to said navigational channel whereby only a single remote station communicates during its assigned time interval.

50. A method according to claim 49 wherein the step of momentarily tuning occurs at periodic intervals of time.

51. A method according to claim 49 wherein the step of momentarily tuning occurs for a period of time which is sufficiently short with respect to the time the navigation system is tuned to said navigational channel.

52. A method of transmitting and receiving communication information on a common communication channel via a navigation system including a first remote station having a navigational unit and a second remote station having a navigational unit, each unit having a navigational channel different than said common communication channel for transmitting and receiving navigational information, comprising the steps of:
  momentarily tuning the navigational unit of said first remote station from its navigational channel to said common communication channel, for receiving said communication information, and then back to its navigational channel;
  momentarily tuning the navigational unit of said second remote station from its navigational channel to said communication channel, for receiving said communication information, and then back to its navigational channel;
  transmitting said communication information from a master communication station to said first remote station at a first discrete time interval assigned to said first remote station, and transmitting said communication information to said second remote station at a second discrete time interval different from said first discrete time interval, assigned to said second remote station; and
  synchronizing the tuning of said first remote station from its navigational channel to said common communication channel with the occurrence of said first discrete time interval, and synchronizing the tuning of said second remote station from its navigational channel to said common communication channel with the occurrence of said second discrete time interval.

* * * * *